H. Y. SCARBOROUGH & J. G. KING.
SANITARY CLOSET.
APPLICATION FILED NOV. 18, 1913. RENEWED SEPT. 27, 1916.

1,223,426.

Patented Apr. 24, 1917.
2 SHEETS—SHEET 1.

WITNESSES

INVENTORS
HARRY Y. SCARBOROUGH
JAMES G. KING
BY
ATTORNEYS

H. Y. SCARBOROUGH & J. G. KING.
SANITARY CLOSET.
APPLICATION FILED NOV. 18, 1913. RENEWED SEPT. 27, 1916.
1,223,426.
Patented Apr. 24, 1917.
2 SHEETS—SHEET 2.
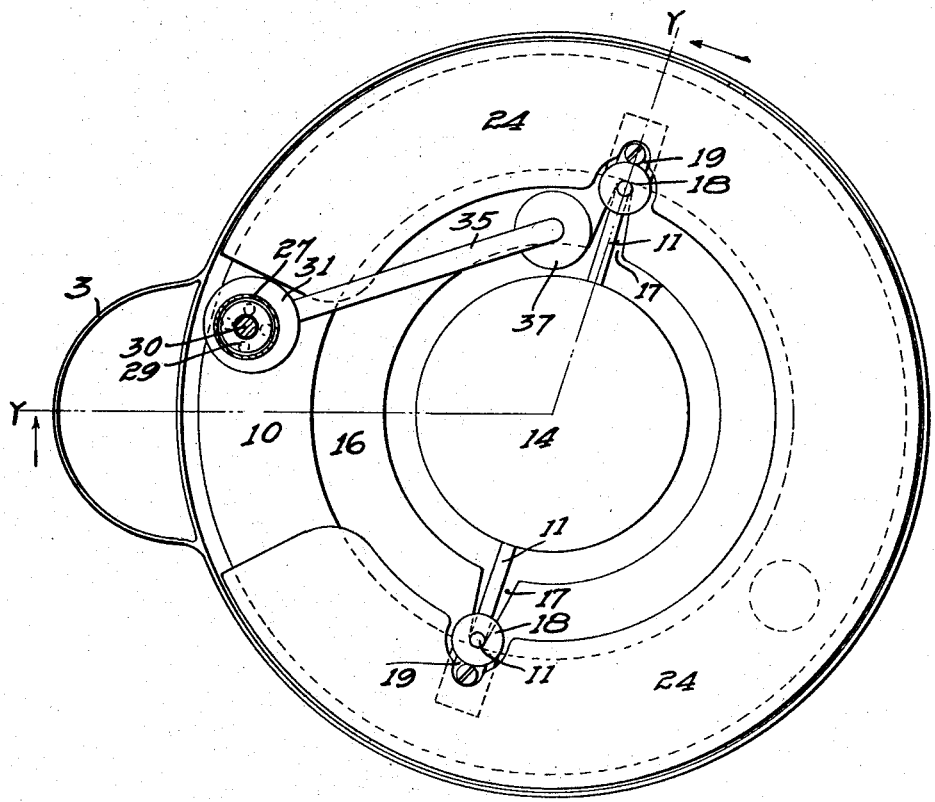
FIG.2.
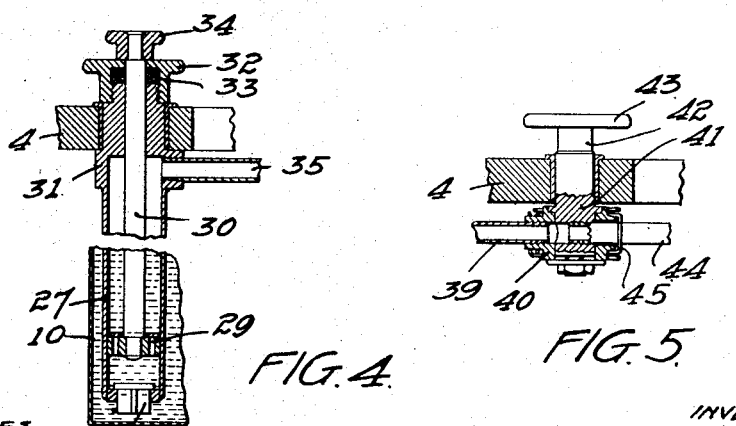
FIG.4.
FIG.5.
WITNESSES
INVENTORS
HARRY Y. SCARBOROUGH
JAMES G. KING
BY
ATTORNEYS

UNITED STATES PATENT OFFICE.

HARRY Y. SCARBOROUGH, OF MINNEAPOLIS, MINNESOTA, AND JAMES G. KING, OF SUPERIOR, WISCONSIN, ASSIGNORS, BY DIRECT AND MESNE ASSIGNMENTS, TO AUTOMATIC CHEMICAL CLOSET COMPANY, OF MINNEAPOLIS, MINNESOTA, A CORPORATION OF MINNESOTA.

SANITARY CLOSET.

1,223,426.      Specification of Letters Patent.      Patented Apr. 24, 1917.

Application filed November 18, 1913, Serial No. 801,726. Renewed September 27, 1916. Serial No. 122,545.

*To all whom it may concern:*

Be it known that we, HARRY Y. SCARBOROUGH and JAMES G. KING, citizens of the United States, residents, respectively, of Minneapolis, county of Hennepin, State of Minnesota, and Superior, county of Douglas, State of Wisconsin, have invented certain new and useful Improvements in Sanitary Closets, of which the following is a specification.

The object of our invention is to provide a sanitary closet having means for concealing the human excreta and provided with a spraying device by means of which all germ life will be destroyed.

The invention consists generally in various constructions and combinations, all as hereinafter described and particularly pointed out in the claims.

Figure 1:
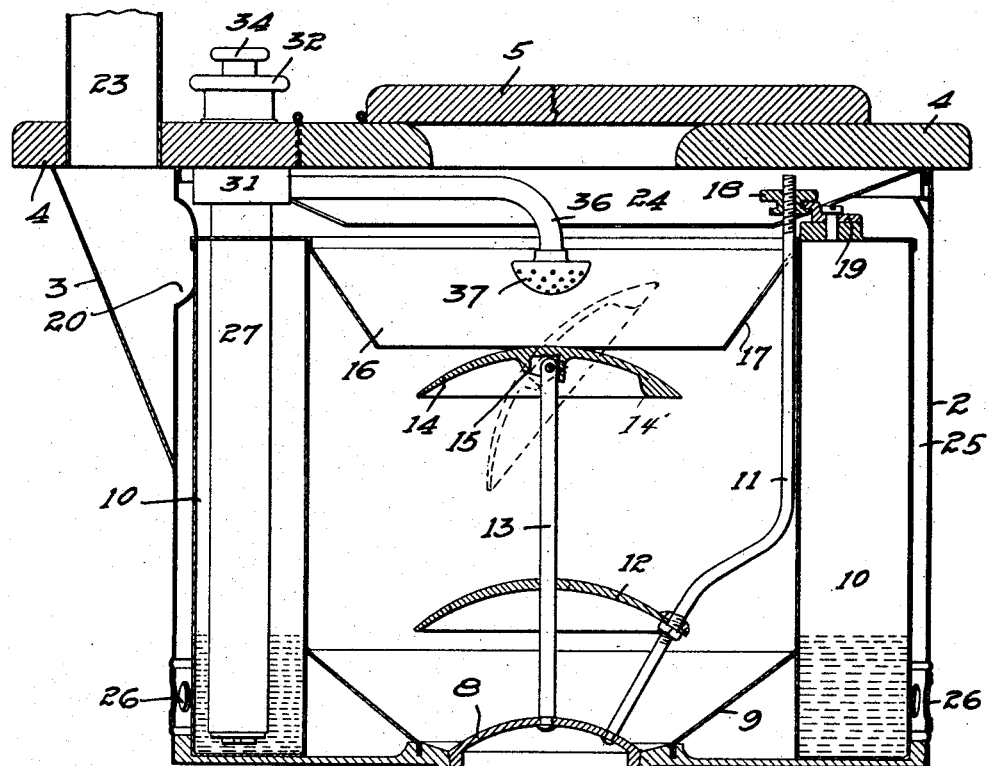
Figure 3:
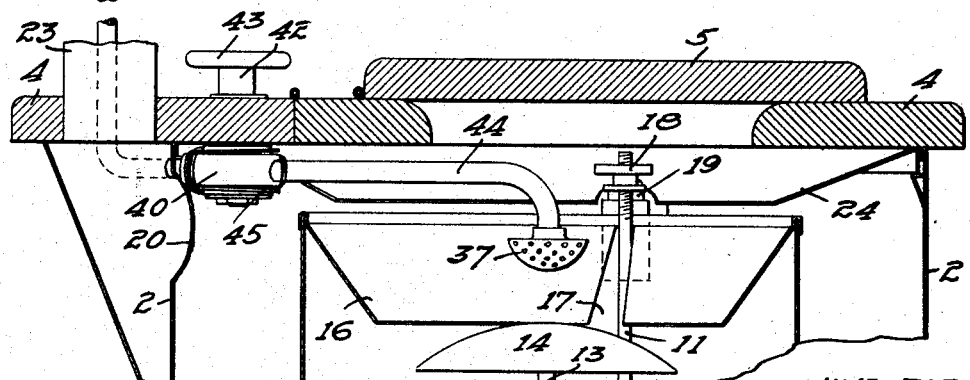

In the accompanying drawing forming part of this specification,

Figure 1 is a vertical sectional view through a closet embodying our invention, taken on the line *y—y* of Fig. 2, looking in direction of arrows, Fig. 2 is a horizontal sectional view of the closet, Fig. 3 is a detail sectional view showing a modified construction of the spraying device, Fig. 4 is a detail sectional view, showing the pump device for spraying the chemical solution into the closet, Fig. 5 is a detail sectional view, showing the valve for controlling the gravity feed or spray to the closet.

In the drawings, 2 represents an outer casing of suitable material, preferably metal, provided with a spout 3 at the rear having a top 4 whereon the seat cover 5 is hinged. A discharge pipe 6 is provided in the bottom of the casing 2, having a seat 7 for the cone-shaped valve 8, which is adapted to drop down upon the seat within the pipe 6 and form a tight joint with the pipe, preventing the discharge of the contents of the closet.

Extending upwardly and outwardly from the pipe 6 is a wall 9. A tank or reservoir 10 is placed within the casing and spaced from the walls thereof and encircles the wall 9 and contacts with the upper edge thereof. This tank is preferably circular in form and adapted to contain a deodorizing and sterilizing agent composed of some suitable chemical preparation. The rods 11 are mounted to slide vertically in the tank and have their inwardly turned lower portions connected to the valve 8 and also to a disk 12 which is arranged above the valve 8. An upright rod 13 is mounted on the valve 8 and projects upwardly through the disk 12 and a disk 14 having preferably a convex upper surface, is hinged on the upper end of the rod 13 and adapted to tilt downwardly on one side until the stop 15 contacts with said rod, this tilting taking place when the excreta falls upon the disk, and is thereby directed into the bottom of the receptacle. The disks are preferably made of porcelain, or of metal coated with porcelain, and normally the lower disk will be wholly or partially submerged in the chemical solution in the tank. The disk is preferably made heavier on one side, as indicated at 14' in Fig. 1, so that it will normally assume a horizontal position.

At the top of the tank 10 is an inwardly inclined wall or flange 16, also beneath the seat opening and provided with transverse slots 17 in which the rods 11 are vertically slidable, the central opening in the walls 16 being of sufficient diameter to allow the disks to be raised entirely out of the closet, the offset portions of the rods 11 sliding through the slots 17 during the vertical movement of the rods in the operation of removing the disks. The upper ends of the rods 11 are preferably threaded and provided with thumb nuts 18 having clips 19 for securing them in place. When these thumb nuts are screwed vertically on the rods, the lower disk or valve 8 will be forced down firmly upon its seat and the discharge opening hermetically sealed.

The disk 14 and the wall 16 coöperate to conceal the contents of the receptacle and prevent it from swashing about and over the side walls of the tank when the closet is in use in a railway coach or other vehicle, and the disk has the further function of aiding in breaking up and separating the excreta and effecting a more thorough mixture with the chemical solution.

The casing has an opening 20 communicating over the top of the tank 10 with the interior of the closet and with the spout 3 that leads to a ventilating pipe 23. This ventilating pipe extends to a chimney or other suitable ventilating stack, not shown. A removable guard or shield 24 is provided beneath the cover 4 and extends under and around the seat opening and arranged to cover an air space 25 between the outer casing and the tank and the lower portion of the casing has port holes 26 therein leading to said air space and through these ports and the air space currents of air circulate around the tank and over it and beneath the guard ring 24, and finally pass out through the opening 20 to the ventilating stack. This guard ring 24 is readily removable when it is desired to lift the rods 11 and remove the valve and disks from the closet.

For delivering a suitable quantity of chemical solution into the receptacle of the closet we provide a pump device extending down into the tank and comprising a cylinder 27 having a valve 28 communicating with the tank, a plunger 29 and an operating rod 30. A hub 31 is provided at the upper end of the pump cylinder, on which is mounted a hand wheel 32 by means of which a limited rotary movement may be imparted to the pump cylinder. The rod 30 extends up through this hub and a suitable packing 33 and is provided with a hand grip 34 by means of which the rod and plunger may be operated. A pipe 35 is mounted at one end in the cylinder of the pump and extends horizontally therefrom under the cover 4 and has a downwardly turned inner portion 36 provided at its lower end with a sprayer 37. This sprayer normally stands in the position indicated by full lines in Fig. 2 at one side of the center of the disk 14, but whenever it is desired to spray the disk, the pump cylinder is rotated, swinging the depending sprayer portion 37 inwardly to a point where the sprayer is concentric substantially with the disk beneath. The pump plunger is then operated and a suitable quantity of chemical solution is admitted into the receptacle and the contents thereof are instantly sterilized and deodorized. The chemical solution falling upon the disk, which will usually assume a tilted position, will wash away any excreta that may have adhered thereto and will thoroughly disinfect the surface of the disk and destroy all germ life in the closet. The receptacle will also throw off a gas from the disk surface which will neutralize any gas which may arise from the contents of the receptacle. The neutralizing of this gas will prevent corrosion of the metal parts of the closet.

Instead of using a force feed in connection with the chemical solution, we may provide a gravity tank 38 located a suitable distance above the closet and having a feed pipe 39 communicating with a casing 40 and a valve 41 arranged therein, said valve having a stem 42 and a hand wheel 43 for rotating it from an open to a closed position, or vice versa, and connected with a pipe 44 for moving it back and forth, toward or from the spraying position. When this valve is rotated to an open position, the chemical solution will flow down by gravity to the sprayer and be discharged thereby upon the disks beneath, cleansing and thoroughly deodorizing and sterilizing them and the contents of the receptacle. As soon as the desired quantity of the solution has been delivered, the valve will be rotated to its closed position by suitable means, such as the spring 45, thereby shutting off the flow of the solution from the tank.

We do not, in this application wish to be confined to the manner of mounting the disks or their relative position with respect to the seat of the closet, or to the form of the tank containing the chemical solution, as shown in Fig. 1, as obviously this tank may extend entirely around the receptacle or only partially so, depending upon the conditions of the installation and the desired quantity of the solution.

In various ways the details of construction herein shown and described may be modified and still be within the scope of our invention.

We claim as our invention:

1. A closet comprising a receptacle, having a seat opening, a tilting disk having a convex upper surface disposed beneath said opening and operating to partially conceal the contents of the receptacle, and means for delivering a chemical solution on the upper surface of said disk.

2. A closet comprising a receptacle having a seat opening, a disk disposed beneath said seat opening and normally concealing the contents of said receptacle, a second disk arranged beneath said first named disk and spaced therefrom, said disks operating to break up the swash of the contents of said receptacle, and means for delivering a chemical solution upon said first named disk.

3. A closet comprising a receptacle having a seat opening, an inwardly inclined wall arranged beneath said seat opening, a disk having a convex upper surface disposed beneath said seat opening adjacent to the lower edge of said wall, and concentric, substantially, with respect thereto, said disk and wall operating to break up the swash of the contents of said receptacle, and means for delivering a chemical solution upon said disk.

4. A closet comprising a receptacle having a seat opening, a disk arranged beneath said opening and having a convex upper surface and operating to conceal the contents of the closet, and means for delivering a chemical solution upon the convex surface of said disk.

5. A closet comprising a receptacle having a seat opening, an upright rod arranged beneath said opening, a disk centrally mounted on said rod adjacent to said opening and operating to conceal the contents of the receptacle, and means for spraying the surface of said disk.

6. A closet comprising a receptacle having a seat opening, a rod vertically mounted therein, a disk pivotally supported on said rod and being free to tilt under the weight of the excrement falling thereon to an inclined position, and means for spraying the surface of said disk.

7. A closet comprising a receptacle having a seat opening, a disk mounted therein beneath said opening, a tank adapted to contain a deodorizing and sterilizing solution, a pipe communicating with said tank and adapted to swing in a horizontal plane and having one end overhanging said disk, a sprayer carried by said overhanging end, and means for delivering said solution to said pipe and sprayer.

8. A closet comprising a casing having a discharge opening and a seat opening, a tank arranged within said casing and adapted to contain a chemical solution, a disk for closing said discharge opening, said tank encircling said disk and opening and forming a receptacle within said casing, a disk mounted within said receptacle beneath said seat opening, and means for delivering said chemical solution upon the surface of said disk.

9. A closet comprising a casing having a seat opening and a depending flange encircling said opening, a disk arranged beneath said opening and flange and operating to conceal the contents of said receptacle, said wall having a transverse slot therein, a reservoir, a pipe leading therefrom and adapted to slide in said slot and having a spraying nozzle to direct a chemical solution upon said disk, and means for delivering the solution from said tank to said sprayer.

10. A closet comprising a receptacle having a seat opening, a wall disposed beneath said seat opening and encircling the same, a disk disposed adjacent to said wall and coöperating therewith to conceal the contents of said receptacle, and means for spraying the surface of said disk.

11. A closet comprising a receptacle having a seat opening, a wall encircling said opening on the under side, a tilting disk disposed adjacent to said wall and coöperating therewith to conceal the contents of said receptacle, and means for spraying the surface of said disk.

12. A closet comprising a receptacle, having a seat opening and a discharge opening, a valve for said discharge opening, a lifting rod for said valve, disks arranged one above another in said receptacle and above said valve, the upper disk being mounted to tilt on its support, and means for spraying the surface thereof.

13. A closet comprising a receptacle having a seat opening, a pivoted disk arranged beneath said seat opening and tilting under the weight of the excrement falling thereon, and a spraying nozzle mounted adjacent to said disk for delivering a chemical thereon, one side of said disk when it is tilted assuming a position near said nozzle.

14. A closet comprising a receptacle having a seat opening, a disk arranged beneath said seat opening, an upright standard whereon said disk is mounted, a tank adapted to contain a chemical solution encircling said receptacle and means for delivering the chemical solution from said tank upon said disk.

15. A closet comprising a receptacle having a seat opening, a member mounted beneath said seat opening to conceal the contents of the closet, a tank adapted to contain a chemical solution encircling said receptacle, a pump for said tank, and a spraying nozzle communicating with said pump and overhanging said disk adjacent thereto.

16. A closet comprising a receptacle having a seat opening and a member mounted therein beneath said opening, a tank adapted to contain a chemical solution, a pipe mounted to swing to a position above said member and to a point at one side of the same and having a spraying device, and means for delivering said solution to said pipe and spraying device.

17. A closet comprising a receptacle, a tank adapted to contain a chemical solution, a pipe communicating therewith and mounted to swing to a point beneath the seat opening of the closet or to one side of the same and having a spraying device, and means for delivering the solution in said tank to said spraying device.

In witness whereof, we have hereunto set our hands this 8th day of November, 1913.

HARRY Y. SCARBOROUGH.
JAMES G. KING.

Witnesses:
GENEVIEVE E. SORENSEN,
EDWARD A. PAUL.

Copies of this patent may be obtained for five cents each, by addressing the "Commissioner of Patents, Washington, D. C."